Patented Mar. 17, 1936

2,033,918

UNITED STATES PATENT OFFICE 2,033,918

LIQUID ORGANO DERIVATIVES OF PHOSPHORIC ACID

Edgar C. Britton, Midland, Mich., assignor to The Dow Chemical Company, Midland, Mich., a corporation of Michigan No Drawing. Application March 22, 1934, Serial No. 716,910

13 Claims. (Cl. 260—99.20)

This invention concerns certain new liquid organo-derivatives of phosphoric acid and ortho-phenyl phenol. The characteristic diphenyl, or phenyl-phenyl, group, $C_6H_5.C_6H_4$—, as well as the phenyl-phenoxy group, $C_6H_5.C_6H_4.O$—, which are present in these compounds, are also known as the "xenyl" and "xenoxy" groups, respectively, which latter terms I prefer to use in this application to avoid confusion of nomenclature. Said new compounds have the general formula

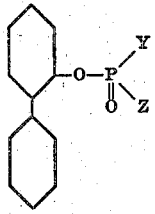

wherein Y represents halogen or any aryloxy group and Z represents halogen or any aryloxy group except the ortho-xenoxy group. The invention, then, consists in the group of new compounds comprising ortho-xenyl phosphoric acid halides and mixed triaryl-phosphates containing at least one ortho-xenyl group. By the expression "mixed triaryl-phosphate", as herein employed, I mean a triaryl-phosphate containing at least two different aromatic groups in the molecule.

Tri-(ortho-xenyl) phosphate is described in U. S. Patent No. 1,858,659. It is a crystalline solid melting at 114° C., which is prepared by heating a phosphorus oxyhalide with 3 moles of ortho-xenol.

I have now discovered that, when one or two of the ortho-xenyl groups in tri-(ortho-xenyl) phosphate are replaced by different aromatic radicals, the resultant mixed triaryl-phosphate is a permanent liquid at room temperature. Such liquid triaryl-phosphate has the general formula

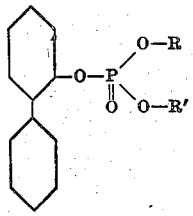

wherein R represents any aromatic radical and R′ also represents an aromatic radical, but not the ortho-xenyl radical.

My mixed triaryl-phosphates having the above general formula are prepared by reacting a phosphorus oxyhalide successively with ortho-xenol or an alkali salt thereof and at least one other phenolic compound, e. g. phenol, naphthol, para-xenol, etc., or the alkali metal salts thereof. The order in which the different phenolic compounds are reacted is of little importance. However, I find it convenient first to react the phosphorus oxyhalide with the proportion of ortho-xenol necessary to form an ortho-xenyl phosphoric acid dihalide, or a di-(ortho-xenyl) phosphoric acid monohalide, as desired, and thereafter to react such acid halide with a different phenolic compound to form the desired mixed triaryl-phosphate product.

Each of such reactions is carried out by heating a mixture of the necessary reactants to a reaction temperature, preferably in the presence of a reaction catalyst such as metallic calcium, magnesium, or aluminum, a chloride of magnesium, aluminum, or iron, etc. The temperature to which a mixture must be heated in order to obtain rapid reaction is, of course, dependent upon the particular reactants employed, the relative proportions of the reactants, the presence or absence of a catalyst, etc. Since, however, the reaction in every case is accompanied by an evolution of hydrogen halide, it is necessary merely to heat the reaction mixture to a temperature at which hydrogen halide is evolved. The reactions are preferably carried out at the lowest convenient reaction temperature, usually below 200° C., since at higher temperatures by-product formation may occur to an objectionable extent.

The intermediate ortho-xenyl phosphoric acid halide products may be separated as such, e. g. by fractionally distilling the reaction mixtures in which they are formed. In forming a mixed triaryl-phosphate, however, I find it convenient, after formation of such intermediate acid halide, to add the desired quantity of a second phenolic compound, e. g. phenol, and to continue the reaction to form the triaryl-phosphate product. By operating in such manner, the extra steps involved in separating the intermediate acid halide product are avoided. After the reaction for the formation of such triaryl-phosphate is completed, the hot reaction mixture is preferably blown with air to remove hydrogen halide and other volatile impurities therefrom and then fractionally distilled to separate the triaryl-phosphate product.

The following equations for the successive formations of (1) an ortho-xenyl phosphoric acid dihalide, (2) a phenyl-(ortho-xenyl) phosphoric acid monohalide, and (3) phenyl-(ortho-cresyl)-(ortho-xenyl) phosphate are illustrative of the type of reactions involved in operating according to the procedure described above:—

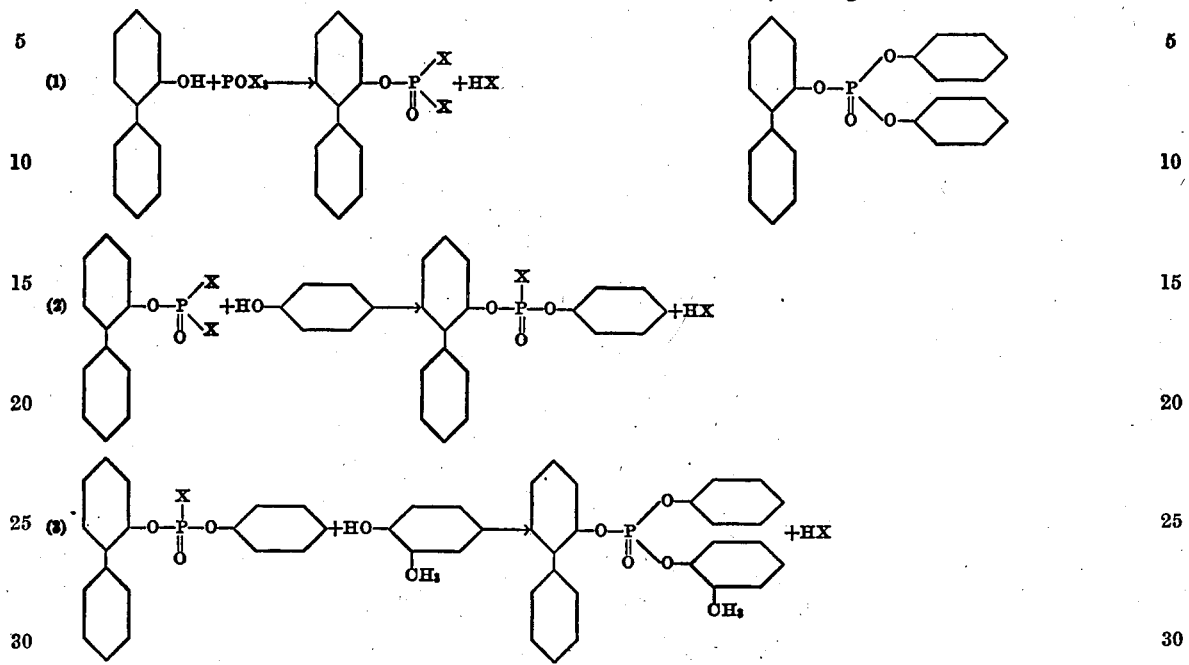

In the above equations X represents halogen.

Example 1

A mixture of 850 grams (5 mols) of ortho-xenol, 1534 grams (10 mols) of phosphorus oxychloride, and 8 grams of magnesium chloride was heated to a temperature between 120° and 135° C. for about 7.5 hours, i. e. until hydrogen chloride was no longer evolved from the mixture. The latter was then fractionally distilled, first at atmospheric pressure until the unreacted phosphorus oxychloride was removed and thereafter under vacuum. There was obtained 741 grams (4.8 mols) of unreacted phosphorous oxychloride, 783 grams (2.7 mols) of ortho-xenyl phosphoric acid dichloride, and 474 grams of higher boiling materials. The ortho-xenyl phosphoric acid dichloride is a colorless liquid boiling at approximately 228° C. at 47 millimeters pressure, having the formula:

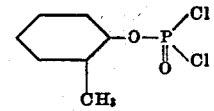

Example 2

A mixture of 144 grams (0.5 mol.) of ortho-xenyl phosphoric acid dichloride, 94 grams (1.0 mol.) of phenol, and 4.5 grams of magnesium chloride was heated to a temperature between 150° and 170° C. for 5 hours. Hydrogen chloride and other volatile impurities were then blown out of the heated mixture with air. The mixture was diluted with 500 cubic centimeters of ortho-dichlorobenzene and washed successively with dilute hydrochloric acid, a dilute aqueous sodium hydroxide solution, and water. The mixture was then dried and fractionally distilled under vacuum, whereby 156 grams (0.39 mol.) of diphenyl-(ortho-xenyl) phosphate was separated. Said product is a colorless, viscous liquid of boiling point 289–290° C. at 11.5 millimeters pressure and of specific gravity 1.230 at 20° C. with respect to water at 4° C., having the formula:

Example 3

(a) 432 grams (4 mols) of ortho-cresol was added gradually in 1.5 hours to 927 grams (6 mols) of phosphorus oxychloride while stirring and maintaining the mixture at about 75° C. After all of the cresol was added the mixture was heated gradually to 120° C. and was maintained at that temperature with continued stirring until the evolution of hydrogen chloride had ceased. The mixture was then fractionally distilled under vacuum whereby 405 grams (1.8 mols) of ortho-cresyl phosphoric acid dichloride, of boiling point 127° C. at 15 millimeters pressure, was separated, which product has the formula:

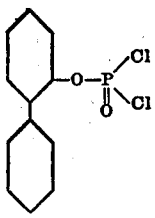

(b) A mixture of 225 grams (1 mol.) of ortho-cresyl phosphoric acid dichloride and 94 grams (1 mol.) of phenol was heated to a temperature between 170° and 190° C. for 12 hours, i. e. until hydrogen chloride was no longer evolved. The mixture was then fractionally distilled under vacuum, whereby 214 grams (0.76 mol.) of phenyl-(ortho-cresyl) phosphoric acid monochloride was separated. Said compound is a colorless liquid, boiling at approximately 200–212° C. at 11 millimeters pressure, and has the formula:

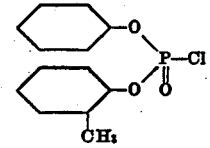

(c) A mixture of 210 grams (0.744 mol.) of phenyl-(ortho-cresyl) phosphoric acid monochloride, 126.5 grams (0.744 mol.) of ortho-xenol, and 1 gram of magnesium chloride was heated at temperatures gradually increasing from 145° to 205° C. for 9 hours. The mixture was then diluted with 300 cubic centimeters of ortho-dichlorobenzene, washed successively with dilute hydrochloric acid, a dilute aqueous sodium hydroxide solution, and water, dried, and fractionally distilled under vacuum, whereby 243 grams (0.58 mol) of phenyl-(ortho-cresyl)-(ortho-xenyl) phosphate was separated. Said product is a colorless, viscous liquid having the boiling point 286–288° C. at 11 millimeters pressure and the specific gravity 1.389 at 20° C. with respect to water at 4° C. It has probably the formula;

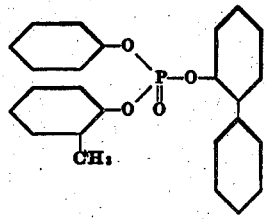

The following table describes a number of other liquid triaryl-phosphates containing the ortho-xenyl group, each of which were prepared by procedure similar to that hereinbefore described.

employ phosphorus oxybromide or phosphorus oxyiodide, in which case my intermediate ortho-xenyl-phosphoric acid halides are bromides or iodides, respectively. For instance, phosphorus oxybromide may be reacted with 1 mol of ortho-xenol to form ortho-xenyl phosphoric acid dibromide, or with 2 mols of ortho-xenol to form di-(ortho-xenyl) phosphoric acid monobromide. Either of the acid bromides just mentioned may be reacted with a phenolic compound other than ortho-phenyl phenol or its salts, e. g. phenol, to form a liquid triaryl-phosphate of the present class. The procedure involved in carrying out such reactions is similar to that hereinbefore described.

My intermediate ortho-xenyl phosphoric acid halides and the mixed triaryl-phosphates prepared therefrom, as already pointed out, are new liquid compounds. The acid halides are useful not only for the preparation of my triaryl-phosphate products, but also as beginning materials for the formation of a wide variety of other organic phosphates containing the ortho-xenyl radical, e. g. diethyl-(ortho-xenyl) phosphate.

Table

| Formula of product | Boiling point | | Specific gravity | Comments |
|---|---|---|---|---|
| | °C. | mm. pressure | | |
| (structure) | 315–320 | 23 | 1.384 at 20° C./4° C. | Viscous, light yellow liquid. |
| (structure) | -------- | -------- | 1.224 at 60° C./4° C. | Viscous yellow liquid. |
| (structure) | -------- | -------- | 1.123 at 60° C./4° C. | Extremely viscous red liquid. |
| (structure) | 273–275 | 0.5 | 1.198 at 60° C./4° C. | Colorless viscous liquid. |

Instead of employing phosphorus oxychloride as a reactant in preparing my products, I may The mixed triaryl-phosphates are substantially non-flammable and are permanently liquid at room temperature, although those of high molecular weight may be quite viscous. They are useful as plasticizing, softening, and fireproofing agents in cellulose acetate and nitrocellulose compositions, varnishes, etc.

Other modes of applying the principle of my invention may be employed instead of those explained, change being made as regards the method herein disclosed, provided the steps or compounds stated by any of the following claims or the equivalent of such stated steps or compounds be employed.

I therefore particularly point out and distinctly claim as my invention:—

1. In a method of making a compound having the general formula;

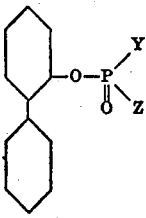

wherein Y represents halogen or an aryloxy group and Z represents halogen or an aryloxy group excepting the ortho-xenoxy group, the step consists in heating a phosphorus oxyhalide to a reaction temperature with not more than twice its molecular equivalent of a compound selected from the class consisting of ortho-xenol and alkali metal salts thereof.

2. In a method of making a compound having the general formula;

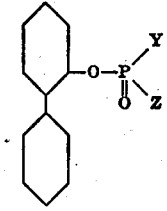

wherein Y represents halogen or an aryloxy group and Z represents halogen or an aryloxy group excepting the ortho-xenoxy group, the step which consists in heating phosphorus oxychloride to a reaction temperature not exceeding 200° C. with not more than twice its molecular equivalent of ortho-xenol in the presence of a catalyst selected from the class consisting of the chlorides of the metals magnesium, aluminum, and iron.

3. In a method of making a compound having the general formula;

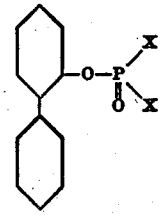

wherein X represents halogen, the step which consists in heating a phosphorus oxyhalide to a reaction temperature with not more than its molecular equivalent of a compound selected from the class consisting of ortho-xenol and alkali metal salts thereof.

4. In a method of making ortho-xenyl phosphoric acid dichloride, the step which consists in heating phosphorus oxychloride to a reaction temperature with not more than its molecular equivalent of ortho-xenol.

5. In a method of making a triaryl-phosphate having the general formula;

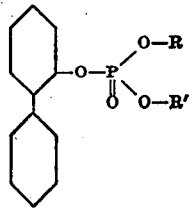

wherein R represents an aromatic hydrocarbon group and R' represents an aromatic hydrocarbon group excepting the ortho-xenyl group, the steps which consist in heating a phosphorus oxyhalide to a reaction temperature with not more than twice its molecular equivalent of a compound selected from the class consisting of ortho-xenol and alkali metal salts thereof, to form an ortho-xenyl phosphoric acid halide, and heating the latter to a reaction temperature with sufficient other phenolic compound to form a mixed triaryl-phosphate.

6. In a method of making diphenyl-(ortho-xenyl) phosphate, the steps which consist in heating phosphorus oxychloride to a reaction temperature with not more than its molecular equivalent of ortho-xenol to form ortho-xenyl phosphoric acid dichloride and thereafter heating the latter to a reaction temperature with approximately twice its molecular equivalent of phenol.

7. In a method of making phenyl-di-(ortho-xenyl) phosphate, the steps which consist in heating phosphorus oxychloride to a reaction temperature with not more than its molecular equivalent of phenol to form phenyl phosphoric acid dichloride and thereafter heating the latter to a reaction temperature with approximately twice its molecular equivalent of ortho-xenol.

8. In a method of making di-(ortho-cresyl)-ortho-xenyl phosphate, the steps which consist in heating phosphorus oxychloride to a reaction temperature with sufficient ortho-cresol to form di-(ortho-cresyl) phosphoric acid monochloride and thereafter heating the latter to a reaction temperature with approximately its molecular equivalent of ortho-xenol.

9. A liquid ortho-xenyl derivative of phosphoric acid having the general formula;

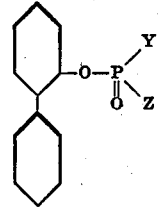

wherein Y represents halogen or an aryloxy group and Z represents halogen or an aryloxy group excepting the ortho-xenoxy group.

10. A liquid triaryl-phosphate having the general formula;

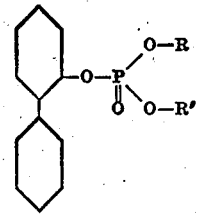

wherein R represents an aromatic hydrocarbon group and R' represents an aromatic hydrocarbon group excepting the ortho-xenyl group.

11. Diphenyl-(ortho-xenyl) phosphate, a liquid at room temperature, boiling at approximately 289-290° C. at 11.5 millimeters pressure and having approximately the specific gravity 1.230 at 20° C. with respect to water at 4° C.

12. Di-(ortho-cresyl)-(ortho-xenyl) phosphate, a liquid at room temperature, boiling at approximately 315-320° C. at 23 millimeters pressure and having approximately the specific gravity 1.384 at 20° C. with respect to water at 4° C.

13. Phenyl-di-(ortho-xenyl) phosphate, a liquid at room temperature, boiling at approximately 273-275° C. at 0.5 millimeters pressure and having approximately the specific gravity 1.198 at 60° C. with respect to water at 4° C.

EDGAR C. BRITTON.